United States Patent [19]
Bardeen

[11] 3,858,169
[45] Dec. 31, 1974

[54] GEOPHONE IMPULSE TESTER
[75] Inventor: Thomas Bardeen, Pittsburgh, Pa.
[73] Assignee: Gulf Research & Development Company, Pittsburgh, Pa.
[22] Filed: Mar. 26, 1973
[21] Appl. No.: 344,548

[52] U.S. Cl............... 340/15.5 CP, 181/0.5 NP, 340/15.5 MC, 73/1 DV
[51] Int. Cl............................................. G01v 1/00
[58] Field of Search................ 181/0.5 NP, 0.5 T; 340/15.5 GC, 15.5 CP, 15.5 MC; 73/1 DV, 1 D

[56] References Cited
UNITED STATES PATENTS
2,923,366  2/1960  Meiners et al. ............... 181/0.5 T
3,088,541  5/1963  Alexander ..................... 181/0.5 T
3,744,294  7/1973  Lewis et al. ..................... 73/1 DV Primary Examiner—Maynard R. Wilbur
Assistant Examiner—H. A. Birmiel

[57] ABSTRACT

Method and apparatus for testing all the channels of a seismic system simultaneously, each channel comprising a string of geophones and recording means to record the signals received by the geophones. The geophones are exercised to stimulate their normal response, in two modes, automatically and sequentially; the unbalanced impulse mode detects a bad string by a deviation from a null line, and the current impulse mode provides a record of the system response to a pre-determined impulse on the seismic record itself.

9 Claims, 5 Drawing Figures

SERIES

*PARALLEL*

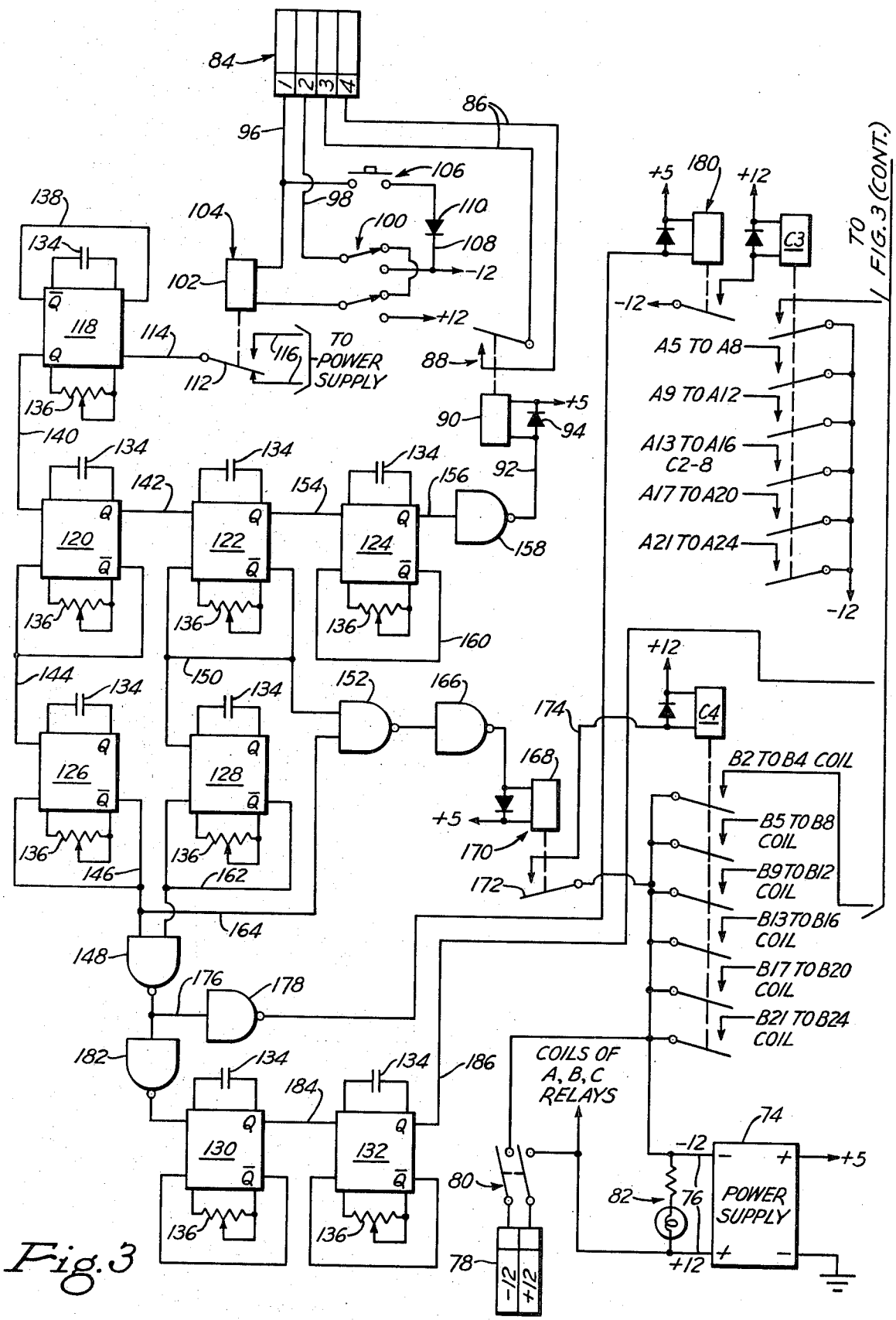

GEOPHONE IMPULSE TESTER

This invention pertains to method and apparatus for dynamically testing strings of geophones.

The seismic method is widely used in exploring for underground mineral deposits, particularly gaseous and liquid hydrocarbons. The seismic system includes the production of waves or vibrations, as by the explosion of a charge of dynamite for example, and then recording these waves after they have travelled down into the earth and then back up to the surface after having "bounced" off of layers in the earth of interest. The travel times of these waves down and then up again correlate to distance from the surface to the underground reflecting horizons. A geophone is the device which is positioned on the surface to receive the reflected waves.

As used herein the term "geophone" shall be understood to mean any device which transforms mechanical vibrations into electrical energy. Geophones have been known for many years and literature references exist at least as early as 1929. A particularly good reference is the textbook entitled: "Geophysical Exploration" by C. A. Heiland, copyright 1946, pages 593 et seq.

Geophones are available from many commercial sources, for example, one popular model is No. HS-1 made by GeoSpace Company of Houston, Texas. In the seismic arts as presently developed, geophones are used in long strings of many geophones, and usually several such strings at a time, so that spurious signals will be cancelled out, and the strings will produce an average signal which is recorded as a single trace on the final seismogram. The traces from the various sets of strings are handled in a host of different ways, as is known to those skilled in the art.

Each geophone usually includes an interchangeable base which may comprise a spike or the like. This spike permits the geophone to be acoustically coupled to the earth, or in the jargon, to be "planted" in the ground. The basis of its operation comprises a spring mounted weight responsive to mechanical vibrations to move a coil in a magnetic field to thereby produce electrical energy. The amount of electrical energy produced is in proportion to the seismic vibrations which the geophones senses.

The details of the more or less standard field procedure is to use anywhere from 12 to 96 lines of geophones, each line containing from one to several hundred separate geophones. Typically, 24 lines containing 54 individual geophones each are used. This array of lines is arranged on the surface of the earth, by "planting" each individual geophone, firing an explosive charge, and recording the results, thereafter moving the array to another location, and repeating the procedure.

The invention has two modes of operation called the unbalanced impulse mode, and the current impulse mode. In both modes the geophones themselves are operated in their so-called "motor mode" in order to determine whether or not the geophones have any faults which would introduce errors into the seismic data when later collected by these geophones.

Heretofore, in testing such arrays after they are planted or emplaced and before firing the shot, only the electrical resistance, i.e., the d-c continuity of each string or line of geophones was checked. This system would find a faulty coil resistance, a short between a coil and a housing, an open or shorted connecting line, or the like. However, this prior system is a check of static conditions only, and would not find faults in the geophone which would appear only when the geophone operates, i.e., under dynamic conditions. It is a primary object of the present invention to dynamically check a line of geophones.

As examples, the following specific conditions would result in poor data, would be found by the method and apparatus of the present invention, and would not be found by the prior resistance check method:

1. A geophone with a faulty spring, such as a spring including fatigued metal or one deformed by rough handling.
2. A geophone with a jammed coil or with foreign matter in the coil/magnet gap sufficient to interfere with the normal relative motion between coil and magnet.
3. A geophone planted out of plumb. Each geophone must be straight in the earth to within a few degrees in order to respond properly.

The common dynamic check now used comprises the operator kicking the ground near a geophone and observing the recorded deflections. This is only qualitative and determines sensitivity to a large amplitude motion, the kick, whereas the seismic motions to be recorded are very small amplitude motions. The "kick" test also only "checks" a single geophone. The present invention checks an entire string. The amplitude is proportional to the power supplied to the geophone string in the motor mode test. It is possible and common for a defective geophone to be sensitive to large motions, such as a kick, but insensitive to small motions. In the present invention, a defective geophone in a string of otherwise good geophones can be detected.

"Motor Mode" is the reverse of normal geophone operation, i.e., a situation in which electrical energy is supplied to the geophone to cause physical motion of the internal operative parts thereof. Thus, in the motor mode, power is supplied to the geophone to effectually cause the geophone to try to move the earth, rather than, as in normal operation, the motions of the earth moving the parts of the geophone to thereby produce electrical energy.

In the unbalanced impulse mode of operation, two strings of geophones are exercised in motor mode and then connected together in phase operation, which may be either a series or a parallel circuit, whereby any output is indicative of a bad string of geophones, and the direction of such an output, above or below null line, is indicative of which of the two strings of geophones is the bad one. In the current impulse mode the geophones are exercised in the motor mode to simulate their normal response, and this response is recorded on the seismogram itself, so that the effect of the instrumentation can be later subtracted from the seismogram rendering it illustrative of only the seismic response.

The invention also includes specific circuitry which is simple in construction and in conception, reliable in operation, and which efficiently achieves the objects of the invention.

The common method used to record and process seismic data is to record the data on magnetic tape and to thereafter process the data on a digital computer. Variations on the recording channel parameters can be removed if the impulse response of each recording channel is known. The process for removing the system response is called deconvolution. The invention provides means to obtain the velocity impulse response of the geophone-geophone cable amplifier system so that variations of the geophone-geophone cable can be included in the deconvolution process. With these variations included, the value of multi-channel processing can be greatly enhanced, see e.g., "The Potential of Digital Seismic Recordings on Multi-channel Processing," J. P. Lindsey, *Geophysics*, Vol. 33, No. 3, June, 1970, pp. 461–470.

An object of the invention is to provide a simple diagnostic means for the field operator (the man in charge of the on-site seismic recording procedures) to easily determine, in the field, the condition of the geophone strings.

Another object of the invention is to allow the apparatus to be either manual or automatic in operation and have it not affect the normal signal in any manner (i.e., be switched out automatically). The system is automatically out of the geophone circuits until activated either by a manual command from the operator or automatically from the recording system.

In the successfully constructed embodiment there are two types of tests; the one to obtain the velocity impulse response of the geophone strings, amplifiers and recording means occurs first and lasts for sufficient time for the impulse response to fall to a low amplitude level, (for example, 600 ms for well clamped 4 Hertz geophones, followed by the unbalance impulse mode which lasts for 300 ms (in this mode only the strong signal portion of the response need be observed.)

The total recording time for a test is 900 ms followed by a 100 ms relay closure to indicate to the recording means that normal operations should resume. The recording time is determined by the natural frequency of the geophones being used and can be shortened if desired when higher frequency geophones are used (e.g., for 8 Hertz geophones, 300 ms impulse mode and 150 ms unbalance mode making a total 450 ms recording time can be used). The zero position on the paper record can automatically be set by means of a one-shot multivibrator period adjustment, as described below.

The above and other advantages of the invention will be pointed out or will become evident in the following detailed description and claims, and in the accompanying drawing also forming a part of the disclosure, in which:

Figure 1:
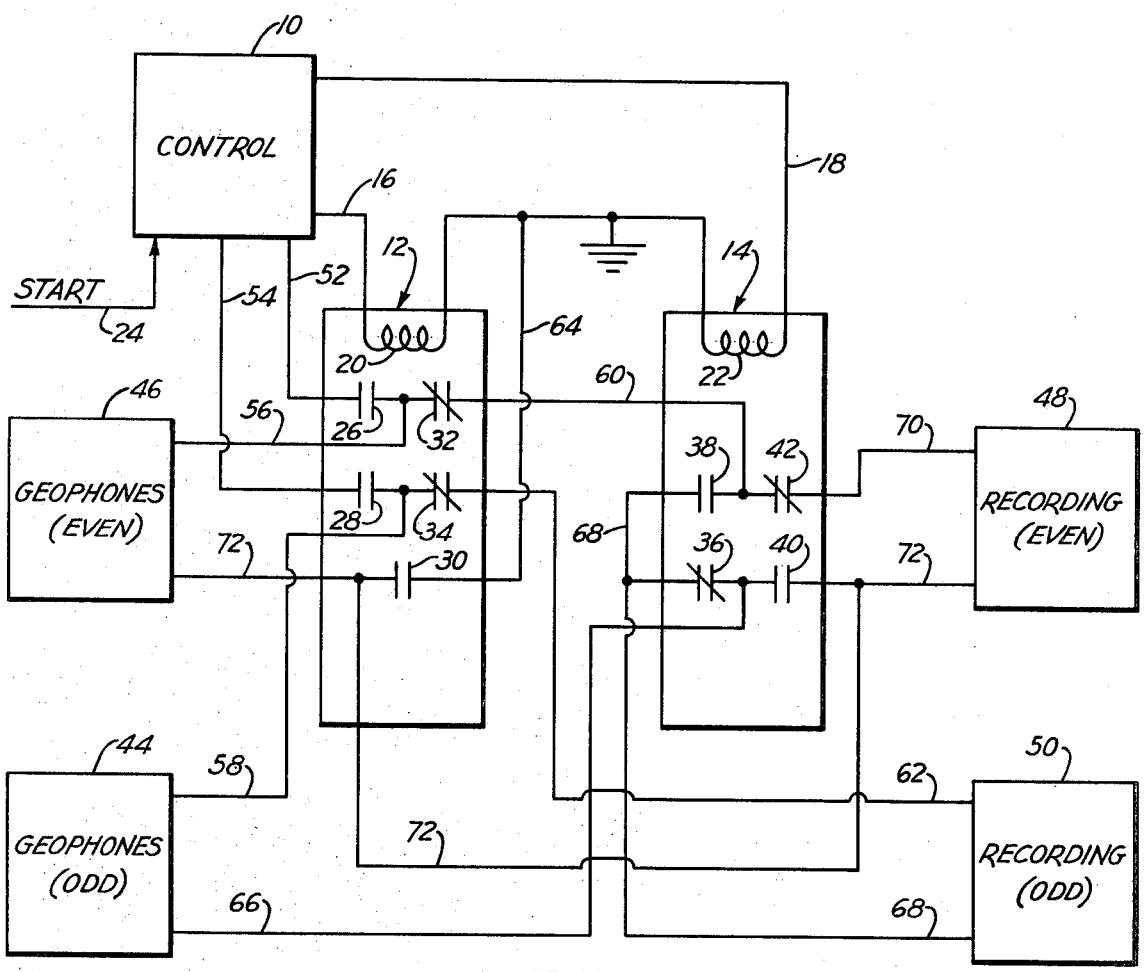
FIG. 1 is a highly schematic diagram illustrating the concepts of the invention.

Referring now to FIG. 1, the invention on this general conceptual level comprises three major components, control circuitry 10, a first relay 12, and a second relay 14. Lines 16 and 18 extend from the control means 10 to the coils 20 and 22, respectively, on the two relays 12 and 14, and these two coils are suitably grounded and brought to a common, in the usual manner. Thus, the relays 12 and 14 are operated directly from the control means 10. The contents of "box" 10 is shown in more detail in FIG. 3. A line 24 indicates the manual start of operation into control 10. Operation can also begin automatically, as will be set forth in greater detail below in regard to FIG. 3.

Relay 12 has five pairs of contacts, three normally open (n.o.) and two normally closed (n.c.). Similarly, relay 14 has four pairs of contacts, two each n.c. and n.o. These nine pairs of contacts are numbered 26 through 42 as shown.

Figure 3:
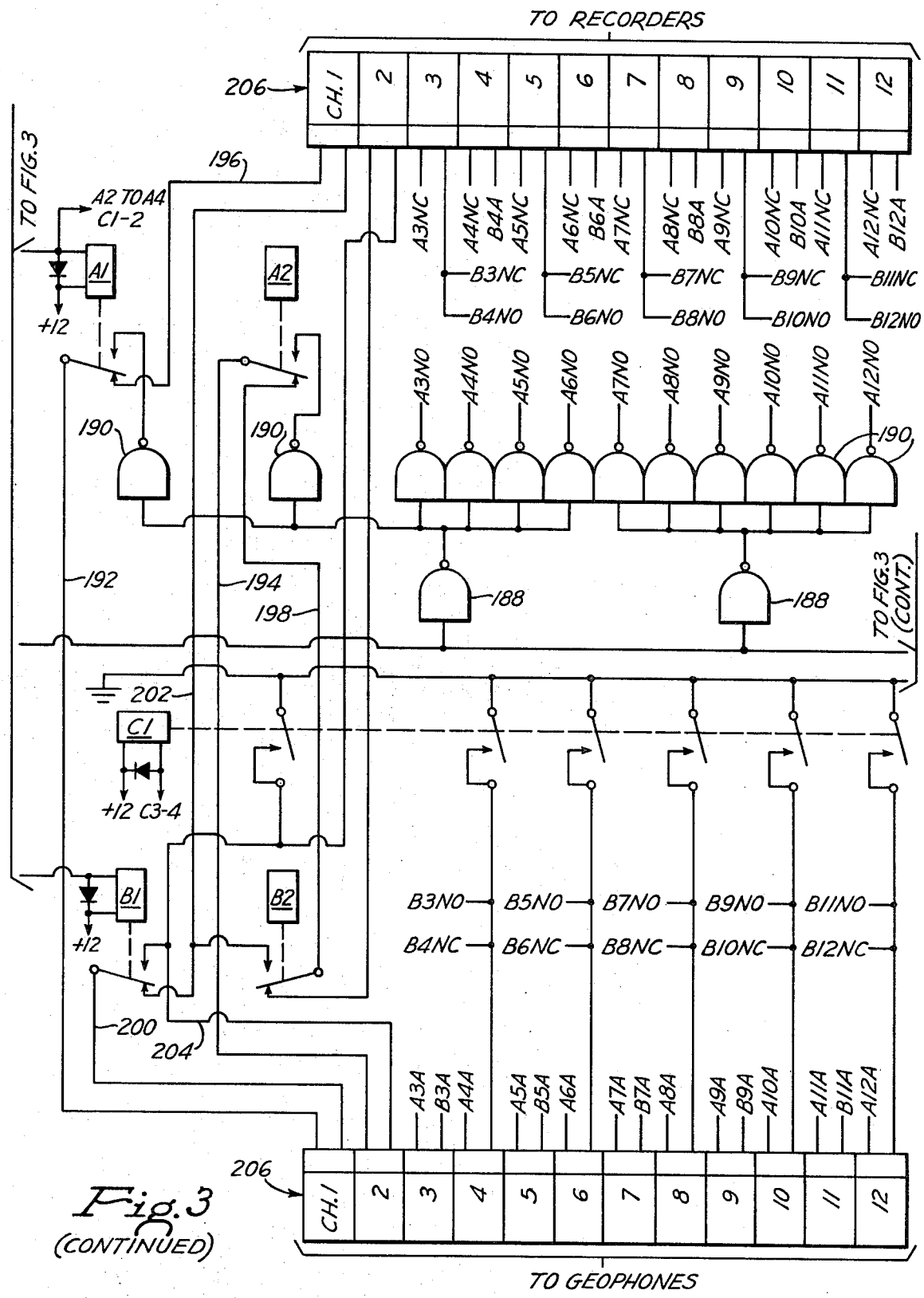
FIG. 3 is an electrical schematic diagram of a successfully constructed apparatus according to the FIG. 1 embodiment of the invention.
Figure 3:
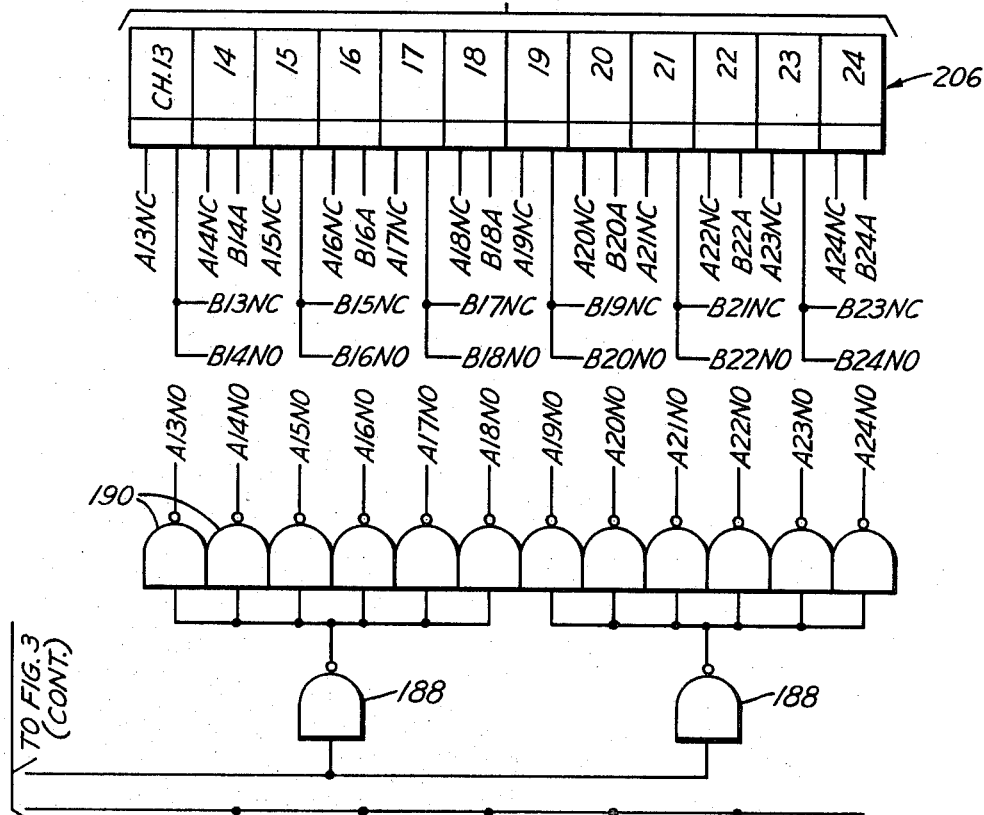
Figure 3:
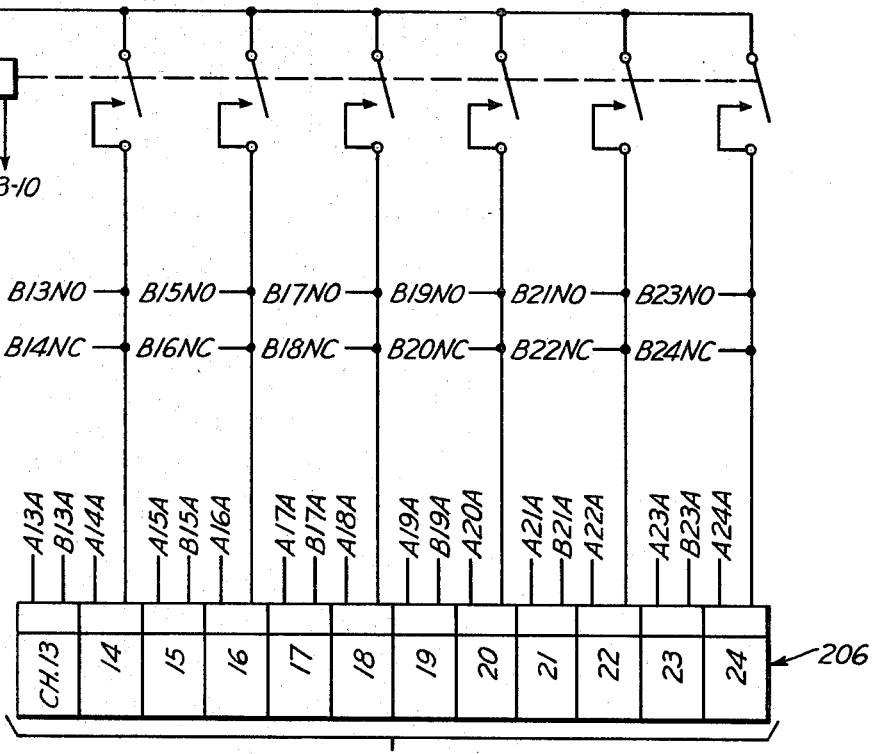

Present-day seismic exploration crews and equipment typically operate with 24 strings of geophones, and the successfully constructed embodiment, as shown in FIG. 3, accommodates that number of strings of geophones. The 24 strings, numbered 1 through 24 inclusive, are wired into the invention circuitry in pairs, i.e., 1 and 2, 3 and 4, 5 and 6, etc. The blocks 44 and 46 labelled "GEOPHONES (ODD)" and "GEOPHONES (EVEN)" indicate the pair of strings of geophones then being tested. The invention utilizes the ordinary recording means in the seismic equipment, and blocks 48 and 50 indicate those means, one for the odd channel and one for the even channel. Recording means 50 can be any such usual equipment such as, amplifiers, magnetic tape devices, and/or paper recorders, or the like.

The remaining lines of FIG. 1 interconnect these seven elements (10, 12, 14, 44, 46, 48, 50) as shown to achieve the manner of operation set forth below. A pair of lines 52 and 54 deliver the signals or impulses which exercise the geophones from the control means 10 via two pairs of n.o. contacts 26 and 28 on relay 12. The opposite side of contacts 26 is connected by the line 56 to one side of n.c. contacts 32 and to one side of the even string of geophones indicated by block 46. The other side of n.o. contacts 28 is connected by a similar branching line 58 to one side of n.c. contacts 34 and to one side of the odd string of geophones in block 44. A line 60 connects the other side of contacts 32 to one side of each of contacts 38 and 42 on relay 14. A line 62 connects the other side of n.c. contacts 34 to the odd recording channel 50. One side of the last pair of contacts on relay 12 is grounded to logic common line 64.

Completing the circuit with respect to relay 14, line 66 interconnects the remaining side of the odd geophone string 44 and one side of each of the other two contacts 36 and 40 on relay 14, and a branching line 68 connects the remaining sides of contacts 36 and 38 together and also to the odd recording channel 50. A line 70 connects the other side of n.c. contacts 42 to even recording channel 48, and a branching line 72 interconnects the remaining sides of n.o. contacts 40, n.o. contacts 30 on relay 12, the even recording channel 48, and the even geophone string 46. This line 72 is effectually a ground line when relay 12 is activated.

Figure 1A:
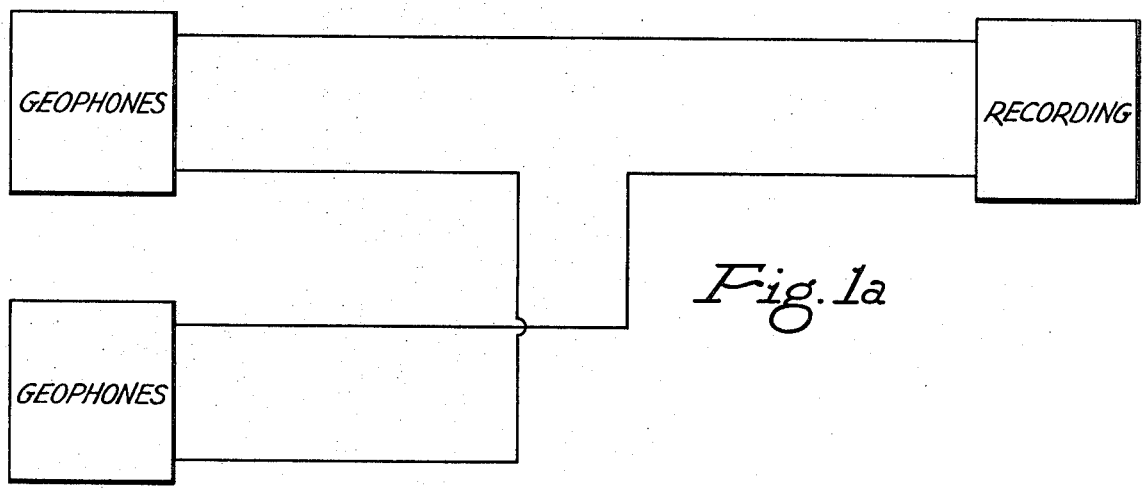
FIGS. 1a and 2a are diagrams helpful in understanding FIGS. 1 and 2 respectively.
Figure 2:
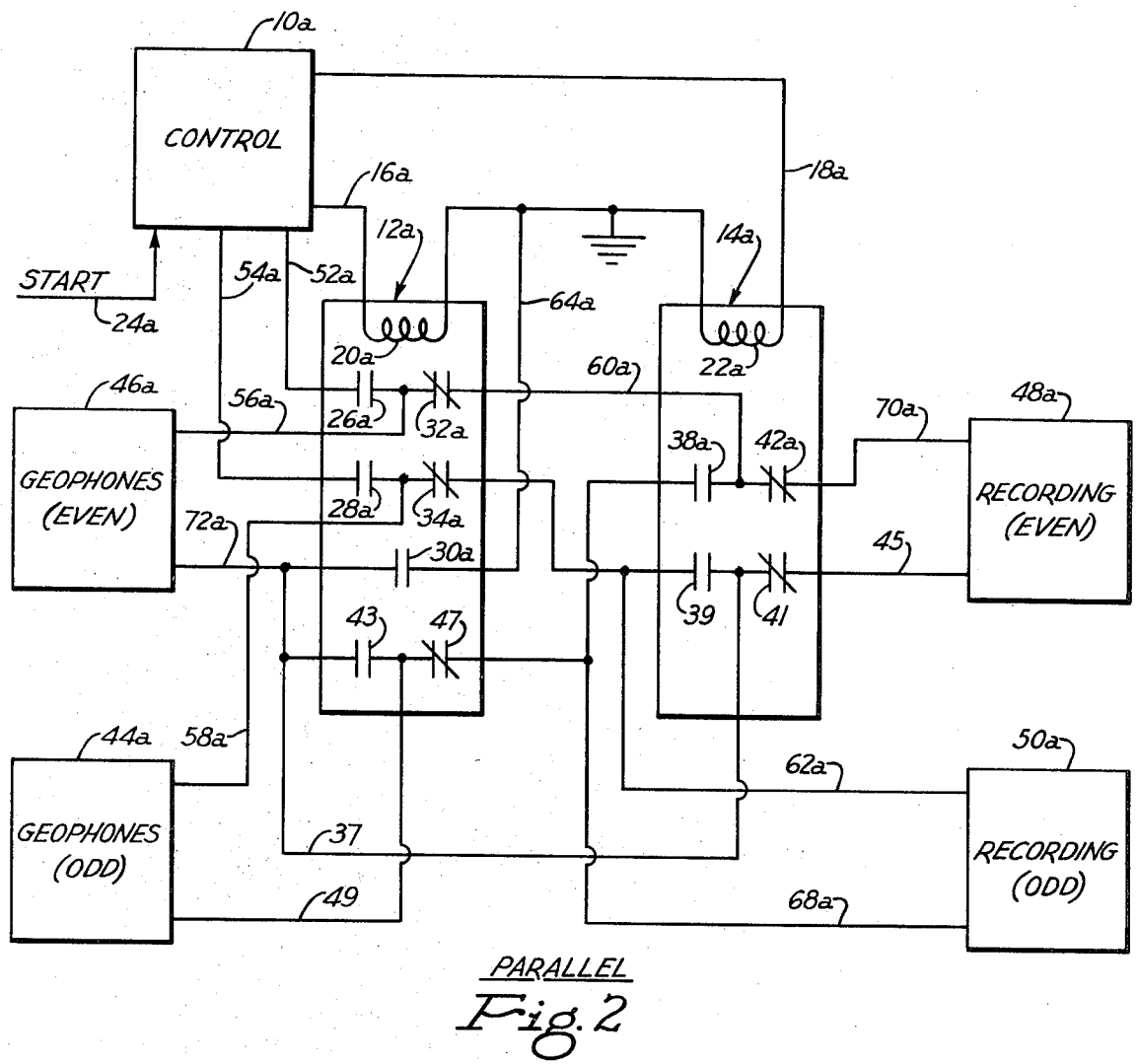
FIG. 2 is a diagram similar to FIG. 1 illustrating another embodiment.
Figure 2A:
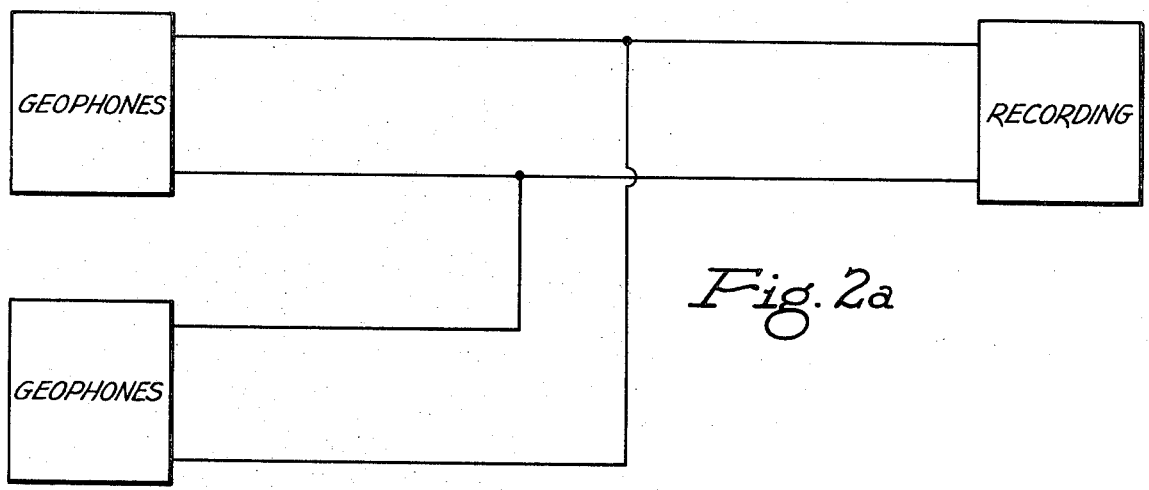

Since the second embodiment of the invention shown in FIG. 2 is very similar to the first embodiment of FIG. 1 those parts in FIG. 2 which are the same as the corresponding parts in FIG. 1 are indicated by the same reference numeral followed by *a*. The essential difference between the two embodiments is well illustrated by FIGS. 1a and 2a from which it can be seen that the FIG. 1 circuit is a series connection and the FIG. 2 circuit is a parallel connection during the latter part of the operation. The FIGS. 1a and 2a are a simplified showing of the manner of connection between the two geophone channels and the recording means when the geophones respond to the energy imparted to them by the invention. It can be seen that in both cases the geophones are connected together in phase opposition, and in series in FIG. 1 and in parallel in FIG. 2. The FIG. 1 series embodiment is preferred solely for the reason that it requires less parts to implement.

The additional contacts comprise a normally closed pair 41 and a normally open pair 39 on the relay 14a. A multiple branching line 37 runs between one side of each of the contacts 39 and 41, connects to line 72a, and connects to one side of a pair of contacts 43 on relay 12a. The other side of contacts 41 is connected to the even recording channel 48a by a line 45.

Relay 12a carries another pair of normally closed contacts 47. contacts 43 and 47 correspond to contacts 40 and 36 of FIG. 1 respectively, i.e., it can be considered that these two contacts have been "moved" to relay 12a in order to accomplish the parallel connection. Following this logic, contacts 39 and 41 are the added contacts. A line 49 interconnects one side of the odd geophone channel 44a with one side of each of the contacts 43 and 47. The remaining side of contacts 47 is connected to a branch of line 68a.

The two controls 10 and 10a are identical in FIGS. 1 and 2 and thus the two relays 12a and 14a are operated in the same order and for the lengths of time as relays 12 and 14 of FIG. 1 as will be set forth in greater detail below. In both embodiments, the driving impulse from the control 10 or 10a is put into the pair of lines 52 and 54 or 52a and 54a, and thence to the geophones separately, all as will be set forth below. The additional contacts in the parallel embodiment are required because the common sides of the geophones must be connected together in the initial part of the operation, and then connected to two different points when the geophones drive the recording means.

OPERATION

A geophone has an inherent natural frequency or a period. The duration of the test impulse, in the current impulse mode, must be much shorter than this natural period, whereby the test signal to exercise the geophone is effectually an impulse to each geophone. For example, most commercial geophones have a natural period in the range of 100 to 200 milliseconds (ms.), and for such geophones the invention is set to produce a D.C. impulse having a duration in the range of 1 to 2 ms. The impulse length can be adjusted for different geophones, and it is this impulse length or time duration which determines the response of the geophones. The idea is to impart a velocity with little or no physical motion, and to then quickly cut off the impulse, allowing the resulting velocity to operate or exercise the geophones, and all the other circuitry. Thus the velocity impulse response of each channel of the geophone-geophone cable, amplifier and recording system can be recorded on magnetic tape so that the effect of channel to channel variation can be removed by digital processing using a deconvolution program or the equivalent. The deconvolved data are then illustrative of only the desired seismic response. As will appear below in greater detail in regard to FIG. 3, the invention provides means to put this instrument effect data at the beginning or end of each seismic record, or each pair of seismic records, to thereby facilitate use of this test information when these records are later processed for use by the seismic analyst or explorationist.

After the start signal on line 24, the control means 10 produce signals on the lines 16 and 18 to operate the coils of the relays 12 and 14. After a short delay, such as about 2 ms. to assure that the mechanical relays have in fact operated, controls means 10 produces the test impulses on the lines 52 and 54. The relays are held in the activated position for a few ms., such as 4 or 6 ms., long enough to allow the test impulse to expire. The test impulse itself in the embodiment being described had a duration of 1 or 2 ms. During this time, the two strings of geophones in blocks 44 and 46 are connected to ground, at one side by line 72 and now closed n.o. contacts 30 on relay 12, and at the other side by line 66, and now closed n.o. contacts 40 on relay 14 to line 72. The odd geophones are connected to line 54 via now closed n.o. contact 28, and the even geophones 46 are connected to line 52 via line 56 and now closed n.o. contacts 26 and relay 12.

After the 1 or 2 ms. impulse time expires, the relay coils 20 and 22 are deactivated, and each geophone string 44 and 46 is connected to its respective recording channel 48 and 50. Starting from the recording channels, the odd loop comprises line 68, contacts 36, line 66, geophones 44, line 58, contacts 34, and line 62. For the even apparatus, the loop comprises line 70, contacts 42, line 60, contacts 32, line 56, geophones 46, and line 72. The invention created impulse thereafter drives the geophones and the instrument effect is recorded on the recording means 48 and 50. The above completes the description of the operation of the invention in the current impulse mode.

In the second or unbalanced mode, the operation is the same up to the expiration of the 1 or 2 ms. driving impulse or the impulse duration time. That is, both relays are activated for 1 or 2 ms. as described above. However, at the end of the 1 or 2 ms. test impulse duration, only relay 12 or 12a is deactivated, and relay 14 or 14a remains activated while the unbalanced mode is being recorded. With relay 12 in the condition shown in the drawing and with relay 14 activated and in a condition opposite that shown in the drawing, (either FIG. 1 or FIG. 2) it can be seen that the two geophone strings 44 and 46 then being tested are connected to each other in phase opposition, and in series in FIG. 1 and in parallel in FIG. 2. The key element or important feature is the phase opposition arrangement, i.e., causing the geophones to work against each other, which permits the invention to record differences or unbalances between the two geophone strings in each pair being tested. Thus, if both strings under test are good, a straight line indicating no unbalance will be recorded on the recording means 50. (The even recording means 48 are not used). In the event of a faulty string, a deviation will appear on the recording means. The direction of this deviation above or below the normal straight line indicates to the operator whether the odd string or the even string of the pair being tested is bad. Thus, in its most general sense, the term "phase opposition" as used in the specification and claims herein should be understood to mean any connection of the two geophone strings under test wherein their outputs cancel each other.

The circuit for the phase opposition mode, starting from recording means 50 is line 68, n.o. now closed contacts 38 on relay 14, line 60, n.c. contacts 32 on relay 12, line 56, the upper end of geophone string 46, line 72, now closed n.o. contacts 40 on relay 14, line 66 (thus interconnecting the two lower ends of the geophones strings 44 and 46 in phase opposition), line 58, n.c. contacts 34, line 62, and back to the recording means 50. Note that recording means 48 are isolated by now open n.c. contacts 42.

The above description of FIG. 1 explains what happens to produce the two desired modes of operation of the impulse tester. The drawing (FIGS. 1 and 2) shows one pair of channels. In actual use a plurality of pairs of channels are operated at the same time. The detector strings for each channel are laid out over the surface of the ground using varying distances to the channels from the recording equipment (from 0 to 1 mile or more). The cable resistance of the leads from the recording truck to the geophone strings for each channel will vary from a few ohms to hundreds of ohms. It is common practice to number the channel furthest from the truck north No. 1 or east No. 1, etc., with the adjacent channel being No. 2, etc., whereby the highest number channel is the furthest from the truck. The cable resistance slightly affects the amplitude of the impulse. Hence, for good cancellation, channels 1 and 2 form a pair, channels 3 and 4 form the next pair, etc. This is why the reason for the notation "odd channel" and "even channel."

The control mechanism 10 is designed to automatically give the proper operating time for the relays for the two modes. It can be designed to give only one mode if desired. For example, if the recording instruments were computer controlled in the field, it would be possible to use the results produced by the first mode to produce the deconvolution in the field, thus obviating the necessity for testing the geophones in the second mode. However, such a procedure is not overly likely and may be prohibitively expensive because a reasonably large size mobile mounted computer would be required to perform such an operation. In the detailed drawing of FIG. 3 described below, mercury wetted relay contacts are used for all switching operations and the solid state logic is designed to give the current impulse mode and then the unbalanced mode. Relays 12 and 14 in FIG. 1 both operate together for 6 ms. While they are operated, a 1 or 2 ms. duration pulse is furnished on leads 52 and 54 to geophones odd and even. When relays 12 and 14 both relax, the velocity impulse response output from the geophone strings odd goes to the recording odd and the response from the geophone strings even goes to the even recording channels. For 4 Hertz natural frequency geophones, when properly damped, the impulse response will be at a low level after about 600 ms. At the end of 600 ms. relays 12 and 14 are again made to operate together for the unbalance mode. Relay 12 stays operated for about 6 ms. and relay 14 for about 300 ms. During the 300 ms. recording time, after relay 12 has dropped out, the geophone string odd is connected to the geophone string even in series using phase opposition so that for identical geophone strings the velocity impulse responses cancel so the output to the odd recording channel will be zero.

In the unbalance mode the signal from the geophone string which has a faulty geophone will be weaker. Hence, the polarity of signal recorded in the unbalance mode will be normal (i.e., the same as for the current impulse mode) when the fault is in the even geophone string, and will be inverted from normal (i.e., opposite that for the current impulse mode) if the fault is in the odd geophone string. This same result obtains in the FIG. 2 parallel circuit just as it does in the series circuit of FIG. 1.

Referring now to FIG. 3, there is shown a detailed electrical schematic of a successfully constructed embodiment of the invention according to the FIG. 1 series circuit. Because of its large size, this FIG. 3 has been broken into two parts (a and b) on two separate sheets of the drawing, in the ordinary manner. Generally, the apparatus on the left is the logic circuitry within control means 10 which operates the relays 12 and 14 and supplies the driving signals, as described above in regard to FIGS. 1 and 2. It should be understood that there is not necessarily an actual correlation between the Figures of the drawing. That is, FIGS. 1 and 2 are highly idealized for the purpose of illustrating the concepts, and FIG. 3 is highly detailed, having been taken from the shop drawings used to build the successfully constructed FIG. 1 embodiment.

As mentioned above, the components on the left are the logic circuitry which provides the driving impulses for the relays. In the lower center portion of the combined halves of FIG. 3 is the power supply. The right hand portion of the drawing is basically only connecting means whereby the circuitry shown is connected to both the recording channels, equivalent to 48 and 50 of FIGS. 1 and 2, and also to the geophones, equivalent to blocks 44 and 46 of FIGS. 1 and 2. Conventional seismic equipment includes one recording channel for each line of geophones, and this is the reason for the 1 through 24 numbering of the jacks for the amplifiers and for the geophone strings in FIG. 3. The array of relays shown in FIG. 3 serves, by example only, to connect one of the odd and one of the even strings of geophones to the respective recording channels in pairs. There are 12 pairs of identical relay circuits connecting to the 24 channels. These 12 pairs allow impulse response of the 24 channels to be simultaneously recorded in the current impulse mode and the unbalance signal to be recorded on the odd recording channels in the unbalance mode. The wiring for one pair is shown in FIG. 3 (channels 1 and 2). Obviously, any number of channels can be connected in pairs by using proper relay combinations along with a plurality of inverter outputs to furnish the 1 or 2 ms. impulses.

The power supply (lower center of drawing) comprises a suitable commercial power supply 74 connected by a pair of lines 76 to a jack 78 via a manual switch 80. The jack 78 is used to connect the entire power supply system into some suitable source of electrical power. In the embodiment described, an array of 12 volt batteries were used, and thus, since parts of the other circuitry utilized 12 volt D.C. electricity, both plus and minus, the lines 76 extend into the circuit as indicated. Suitable indicating means 82 such as a pilot light is arranged in parallel across lines 76 to indicate the operative condition of the power supply. Power supply 74 also provides +5 volts D.C. and a ground terminal as shown. For the purpose of simplifying the drawing, connections to the power supply from other parts of the circuitry will be indicated by the symbol for ground, or by the legend +5 or +12 or −12. The connections of the solid state logic components to power is not shown in full.

The invention is built around 24 relays equivalent to relay 12 in FIG. 1 which are called the A relays in FIG. 3; 24 relays equivalent to relay 14 of FIG. 1 which are called the B relays in FIG. 3, and four relays having various purposes called the C relays. The circuit also uses a number of other relays which will be described as they appear in this description. The interconnections to the various A, B and C relays and the various contacts thereon are indicated by suitable legends in all cases after the first two channels. That is, the circuitry for the first two channels 1 and 2 is shown in full detail, and the circuitry for the remaining channels is indicated by suitable legends, it being understood that the circuitry shown in detail for the first two channels is repeated 12 times in all, one for each pair of channels.

Means are provided to automatically operate the circuitry and to furnish external interlock signals. In normal operation all recording means have a start record command and an end record command (to start and stop the recorder). Hence, the impulse tests can be inserted at the beginning (using the start command) or preferably at the end (using the end command) of each recording automatically. The recording means should be converted so that a closure (pulse or steady) is necessary to execute the command. The closure is not used for its normal function (fire the shot if a start command or end recording if an end command), but is furnished to the impulse tester. At the completion of the impulse tester timed sequence of events (by the logic circuitry as described below) a closure is furnished by the tester to the recorder to initiate the desired function on a delayed basis (delayed by the time for the recording of the impulse tests).

Automatic operation comprises operating the invention in its two modes seriatim for all of the channels simultaneously. To this end, a multiple plug 84 is provided to connect the logic circuitry on the left to fire the shot if data are at the beginning, or to end the recording if data are inserted at the end of each seismic record.

A first pair of lines 86 off of plug 84 are controlled by a n.o. pair of contacts 88 on a relay 90. The coil of relay 90 is connected to power supply 74 as indicated by the legend +5, and is controlled by signals on a line 92 from the other circuit elements described below. A protective diode 94 is provided for the coil of relay 90 in the usual manner. This relay 90 controls the automatic command to the control portion of the recording means.

Two other lines 96 and 98 off of plug 84 are used for either manual or automatic operation. A switch 100 in line 98 serves to connect the coil 102 of a relay 104 into the circuit of lines 96 and 98 so that said coil 102 can be operated automatically by a closure furnished by the recording means (not shown) connected to these positions on the plug 84, which is the position shown in the drawing. Alternatively, in the opposite position of switch 100, operation of the invention circuitry will be manual under the control of a n.o. push button switch 106 positioned in a line 108 extending between lines 96 and the power supply feedline to the manual position on switch 100. Suitable protecting means such as a diode 110 is provided in line 108.

The contacts 112 on relay 104 serve to connect line 114 to one or the other of a pair of lines 116, which lines 116 are connected into power supply 74 at whatever voltage or ground is required by the following circuitry described below. Relay 104 effectually "turns on" the logic circuits. In the successfully constructed embodiment, lines 116 carry +5 volts on the n.c. contact switched to common on the n.o. contacts to make the one shot multivibrator 118 fire (go from +5 to ground on Q, and the reverse on Q).

The logic circuitry is built around eight one-shot multivibrators, called flip-flops, indicated by reference numerals 118 through 132. All of these flip-flops are of the same construction, and means are provided on each to set its time duration, that is, to adjustably provide a time during which it will remain activated in response to a signal causing it to change stage. In each case, these adjusting means comprise a capacitor 134 and a potentiometer 136. The values of each of these devices 134 and 136 is changed for each flip-flop 118 through 132 as required to give that particular device the time constant set forth in the following description, or any other time constant as may be required.

The first flip-flop 118 is provided solely for the purpose of "smoothing" the operation of the contacts 112 on a relay 104. Therefore, the line 138 is provided to accommodate the unused half of flip-flop 118. The legend Q and Q on each flip-flop in the drawing indicates the two outputs of a flip-flop which are always the opposite of each other in the usual manner. The unmarked terminals opposite Q and Q are the inputs to the one shot (OR gate inputs). The flip-flops fire when either one is switched from +5 volts to common. The normal state of the one shot is Q at +5 volts.

The time constant of flip-flop 118 is chosen to match the normal delay time between the start command of the recording system and the position on the recording where the impulse should appear.

Thus, the logic series is entered by a change from +5 volts to common on the line 114 going into flip-flop 118, which change causes this flip-flop to produce a change from +5 volts to common on line 140 which is the input to the next flip-flop 120. The means 134 and 136 associated with flip-flop 120 as described generally above, causes this device to have a time constant of 600 ms. After the expiration of the 600 ms, terminal Q of flip-flop 120 changes from 5 volts to ground producing a signal on line 142 to the next flip flop 122, causing it to change state. At the start of the 600 ms. time constant of flip-flop 120, a change from +5 volts to common occurs on line 144 hence on the input of flip-flop 126. This causes flip-flop 126 to change for 6 ms., and will change the output from +5 volts to ground for this length of time on its branching output line 146 leading to an OR gate 148. All the one shots have the unused input connectd to the Q. This prevents the one shot from misfiring from stray impulses by keeping the unused input at ground. The one shot fires when either input goes from +5 volts to ground. Flip-flop 122 has a time constant of 300 ms., and at the start of this period it provides a change from +5 volts to common on a looping branching line 150 which leads to the input of flip-flop 128 and OR gate 152. At the end of the 300 ms. time, flip-flop 122 produces a change from +5 volts to common on line 154 to the input of flip-flop 124. The output Q of 124 is normally ground and it switches to +5 for 100 ms. Hence, the input 156 of inverter 158 is normally ground and is +5 for 100 ms. The output of 158 goes by line 92 to operate the relay 90. Coil 90 then operates contacts 88 to provide a signal on lines 86 indicating that the circuitry has completed a cycle. The 100 ms. period on flip-flop 124 is set to give the proper closure time to contacts 88 for the recorder function to begin. It is only used for the automatic operation of the impulse tester. A line 160 shunts the Q output of flip-flop 124 to the unused input.

The means 134 and 136 on flip-flop 128 provide a 6 ms. time duration pulse on a looping line 162 which is the second input line to OR gate 148. A line 164 traps into line 146 and is the second input to OR gate 152. The output of OR gate 152, via a sign correcting gate 166 operates the coil 168 of the relay 170. N.o. contacts 172 on relay 170 operate the coil of relay C-4 via a line 174 and a suitable connection to the power supply 74. When lead 164 goes from +5 volts to ground at the beginning of the 600 ms. period (one shot 120 and 126 fired), relay C4 operates for about 6 ms. (the time set by flip-flop 126). At the end of the 600 ms. period, lead 150 goes from +5 volts to ground for 300 ms. (the time set by flip-flop 122). Hence, C4 operates twice, once for 6 ms. at the start of the impulse sequence and for 300 ms. after a 600 ms. delay.

The output of OR gate 148 serves to both provide a driving signal to the coils of the A relays and to provide the impulse through the geophones. To this end, the upper branch line 176, via a sign correcting gate 178, operates the coil of a relay 180, the n.o. contacts of which operate the coil of relay C-3 as shown. At the start command flip-flop 120 and 126 operate so that relay C-3 operates for a time of about 6 ms. (set by the period of flip-flop 126). After 600 ms. flip-flop 128 operates and, hence, C3 operates again for about 6 ms. (set by period 128). The OR gate 148 operates twice for about 6 ms. The array of relays 180 and C-3 is solely for the purpose of achieving a boost in current. The n.o. contacts of relay C-3 operate the coils of all the A relays, A-1 through A-24 inclusive as shown in groups of four, and the coils of the relays C-1 and C-2. Referring back to OR gate 148, the lower branch line includes a sign correcting gate 182, and then passes on to the input of flip-flop 130 which has a time duration of 6.5 ms. After this delay, flip-flop 130 operates flip-flop 132 via a line 184, flip-flop 132 having a time period of one ms. The output is present on a line 186 which connects to an array of OR gates 188. The Q outputs of the two flip-flops 130 and 132 are shunted as shown. Thus the OR gates 188 are at +5 volts for 1 ms. (the operating time of flip-flop 132) delayed from the operate command of relay 180 by the operate time of flip-flop 130. This delay allows relays A and B to operate before the 1 ms. pulse occurs.

Each of the four OR gates 188 operates six OR gates 190, the outputs of each of which passes to one n.o. terminal on an A relay. This "fan-out" procedure keeps the OR gates within their current rating and provides isolated pulses for each geophone channel. The output of the OR gates 190 corresponds to the lines 52 and 54 of FIG. 1. The common terminals of the contacts on the A-1 and A-2 relays and on each subsequent pair of A relays is connected by a pair of lines 192 and 194 to one input of each of the first strings of geophones. Lines 194 (even channel) and 192 (odd channel) correspond to lines 56 and 58 respectively of FIG. 1. The n.c. side of the A-1 contacts are connected by a line 196 to an odd recording channel corresponding to line 62 in FIG. 1. The n.c. of the A-2 contacts (and of each subsequent even numbered A relay) is connected by a line 198 to the common terminal of the B-2 relay (and at each subsequent even numbered B relay) and this line corresponds to line 60 of FIG. 1. Turning now to the B relays, the structure is quite analogous to that described above in regard to the A relays. Relay 168 provides a current boost to operate relay C-4 via line 174 (which supplies a current boost), and this relay C-4 operates the coils of all the B relays in groups of four just as all the A relays are operated by relay C-3. The common terminal on the B-1 contacts is connected by a line 200 to one side of the odd geophone channel, this line corresponds to line 66 of FIG. 1. The n.c. side of the B-1 contacts is connected by a branching line 202 to the n.o. side of the B-2 relay contacts and also to the second terminal on the odd recording channel, thus corresponding to line 68 of FIG. 1. The n.o. side of the B-1 contacts is connected by a branching line 204 to the second terminal of the even geophone string and of the even recording channel, and to a pair of n.o. contacts on the relay C-1. This line 204 corresponds to a line 72 of FIG. 1. The C-1 n.o. contacts correspond to the n.o. contacts 30 of relay 12. Referring back up to relay C-3 it can be seen that, relays C-1 and C-2 are operated by relay C-3 along with the coils of the A relays. Thus, relays C-1 and C-2 can be considered functionally as another part of the A relay system.

The wiring is identical for each subsequent pair of geophone strings and recording channels, as indicated by the legends on the drawing. The devices 206 are 24 position plugs to accommodate either twelve geophone strings or twelve recording channels.

The operation of this successfully constructed embodiment of FIG. 3 is identical to that described above in regard to FIG. 1. The significant difference is that the additional wiring for 24 channel operation is shown. The interface for automatic operation with a recording system using magnetic tape is included, but is not necessary, as manual operation can be used optionally.

The control circuitry could be simplified if only the current impulse mode or only the unbalance mode were desired. The switching as shown for inserting the tester in a 24 channnel system can be easily modified to extend its operation to 48 or more channels by additional OR gates for the current impulse insertion and switching for the additional channels.

Single pole relays using mercury wetted contacts were used for the signal circuit switching for reliability and simplicity. Solid state switching presents difficulties unless a multiplicity of isolated power supplies are also provided.

In field use the tester can be used to select balanced geophone strings or single geophones for special testing where good balance is necessary. Normal digital grade geophone tolerance is 10 percent on sensitivity, 1 percent on coil resistance, 1 to 3 percent on natural frequency, and about 10 percent on damping. With this type of tolerance geophones planted at an angle can be detected when it affects the output signal by about 5 percent. If geophone strings were made up of selected geophones to give a 1 percent tolerance on string sensitivity more accurate determination of faults could be made in the field. A two channel geophone tester could be used by the geophone manufacturer to detect and check the strings to achieve this type of tolerance, without greatly increasing the costs. Further, the invention can provide a two channel tester for easy classification of geophones in tolerance groups so that high and low sensitivity geophones can be put into geophone strings in pairs so string sensitivity tolerance can be held to closer limits than individual geophones.

While the invention has been described in detail above, it is to be understood that this detailed description is by way of example only and the protection granted is to be limited only within the spirit of the invention and the scope of the following claims.

I claim:

1. A method of testing a pair of seismic channels, each of said channels comprising a string of geophones and a recording means adapted to record the impulses sensed by said geophones, comprising the steps of producing an impulse having a predetermined time duration which is substantially shorter than the natural period of each geophone in said string of geophones, supplying said impulse of said predetermined time duration to said pair of strings of geophones, connecting said pair of strings of geophones together in phase opposition with each other and to one of the recording means of one channel of said pair of seismic channels, whereby a deviation from a balanced condition will appear as a deviation from a null line on said recording means and the direction of the deviation from said null line is indicative of which string of geophones of said pair of strings of geophones is not normal.

2. The method of claim 1, and separately supplying a second impulse of predetermined time duration to each of said strings of geophones, and then recording the response of each of said strings of geophones to said impulse, whereby the instrument response can later be removed from the seismic data recorded by said strings of geophones.

3. The method of claim 2, wherein said instrument response is recorded on each seismogram produced by said recording channel.

4. The method of claim 1, wherein said pair of strings of geophones are connected together in series with each other and in series with said one of said recording means.

5. The method of claim 1, wherein said pair of strings of geophones are connected together in parallel with each other and then in series with said one of said recording means.

6. A method of testing a seismic channel comprising a string of geophones and a recording means adapted to record the impulses sensed by said geophones, comprising the steps of producing an impulse having a predetermined time duration which is substantially shorter than the natural period of each geophone in said string of geophones, supplying said impulse of said predetermined time duration to said string of geophones, connecting said string of geophones to its recording means in time to receive the impulse response of said geophones, recording on each recording means the response to said impulse of said seismic channel whereby the seismic channel response can later be removed from the seismic data recorded by said recording means.

7. In equipment for seismic exploration comprising a plurality of seismic channels each having a string of geophones and a recording means adapted to record the signals produced by said string of geophones, each geophone of said string of geophones having a natural period, the improvement comprising control means between said recording channels and said strings of geophones, said control means comprising means to produce an impulse adapted to drive said geophones in motor mode, means to set the time duration of said impulse shorter than the natural period of the geophones, said control means comprising relay means for interconnecting said geophones with said impulse producing means and for interconnecting said recording means with at least one of said strings of geophones after the expiration of said predetermined impulse time and prior to expiration of the impulse response of said string of geophones.

8. The combination of claim 7, said relay means comprising means to connect a pair of said string of geophones together in series with each other and in series with one of the recording means associated with one of said string of geophones.

9. The combination of claim 7, said relay means comprising means to connect a pair of strings of geophones together in parallel with each other and then in series with one of the recording means associated with one of said strings of geophones.

* * * * *